April 2, 1968   C. F. GUERCI ET AL   3,376,157

METHOD OF PREPARING TRANSPARENT FERROMAGNETIC SINGLE CRYSTALS

Filed Nov. 1, 1963

INVENTORS
CARL F. GUERCI
MERRILL W. SHAFER

BY
ATTORNEY

United States Patent Office 3,376,157
Patented Apr. 2, 1968

3,376,157
METHOD OF PREPARING TRANSPARENT FERROMAGNETIC SINGLE CRYSTALS
Carl F. Guerci, Mount Kisco, and Merrill W. Shafer, Yorktown Heights, N.Y., assignors to International Business Machines Corporation, New York, N.Y., a corporation of New York
Filed Nov. 1, 1963, Ser. No. 320,798
6 Claims. (Cl. 117—106)

ABSTRACT OF THE DISCLOSURE

A process for epitaxially depositing optically transparent, ferromagnetic, single crystal films of europium II chalcogenides selected from the group consisting of europium oxide, europium sulfide, and europium selenide is described. A suitable single crystal, MgO for example, is placed in a container formed from a pure powder of one of the chalcogenides and covered. The container is then heated in vacuuo in a temperature range of 600–1850° C. for a time sufficient to form a single crystal film from chalcongenide material from the walls of the container.

---

Since it is known that polycrystalline materials because of grain boundaries and voids are generally opaque, it is necessary that the materials used in optical devices be in single crystal form, thus rendering them more transparent. In general, divalent europium compounds (for example, $EuSiO_4$) because of their high magnetic susceptibility and relatively low optical absoption, are useful as Faraday rotators in magneto-optical devices such as laser beam modulators, light switches, etc. Previously, isotropic europium containing compounds (such as EuO, EuS, and EuSe) have not been prepared in single crystal form, and hence, were of limited use in optical devices due to their being optically opaque. This invention describes the preparation of single crystal films of EuO, EuS, and EuSe which are transparent and ferromagnetic and, consequently, can be utilized in magneto-optical devices.

It is well known that when a light is passed through a magnetic material in which there are unpaired electrons, there will be an interaction and the light will be rotated in a manner which is dependent on the number of unpaired electron spins of the material (i.e., the Faraday effect). This Faraday effect is usually defined in terms of Verdet's constant which is the observed rotation in minutes per gauss per centimeter thickness. Thus, the greater the number of unpaired electrons and their ability to align in a magnetic field, the greater will be the specific rotation of the light that the material can transmit (i.e., the specific rotation is directly proportional to the magnetic susceptability of the material).

Europium II chalcogenides are materials which have unpaired electrons and are transparent in the visible and the near visible spectrum (i.e., wavelengths greater than 4500 A.) in their single crystal form and are ferromagnetic.

It is an object of the invention to prepare ferromagnetic single crystal films of europium II chalcogenides.

It is a further object of the invention to prepare transparent ferromagnetic single crystal films of europium II chalcogenides.

Another object of the invention is to epitaxially deposit optically transparent ferromagnetic single crystal films of EuO, EuS, and EuSe.

Still another object of the invention is the preparation of transparent ferromagnetic single crystal film of europium oxide.

A still further object of the invention is the preparation of a transparent ferromagnetic single crystal film of europium sulfide.

Further, another object of the invention is the preparation of a transparent ferromagnetic single crystal film of europium selenide.

A still further object of the invention is a magneto-optical device utilizing a crystal of transparent ferromagnetic single crystal films of a europium II chalcogenide.

Another object of the invention is a magneto-optical device utilizing a crystal of transparent ferromagnetic single crystal films of a europium II chalcogenide selected from the group consisting of europium oxide, europium sulfide and europium selenide.

The foregoing and other objects, features, and advantages of the invention will be apparent from the following more particular description of a preferred embodiment of the invention as illustrated in the accompanying drawings.

Figure 1:
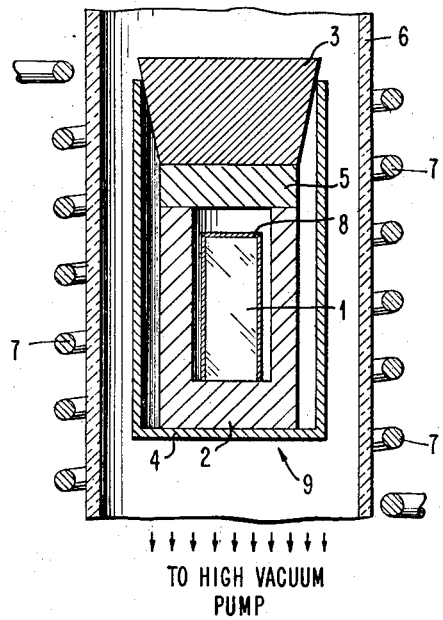
FIG. 1 is a cross-section of the crucible assembly used in a continuous pumping vacuum system at temperatures above 1200° C.

The transparent single crystal films of EuO, EuS, and EuSe are prepared by taking the pure powder of one of the heretofore referred to materials and forming it into a container (or crucible) and a tight fitting lid. The interior volume of the container (or crucible) must be of sufficiently adequate size so that it will contain a single crystal seen which provides the substrate on which crystals will grow epitaxially. Since the europium compounds have a rock salt structure, the crystal seen substrate should also have this structure and preferably should also have a lattice constant similar to the material to be deposited on it. Examples of crystal seeds which can be used as substrates are MgO, CaO, SrO, and BaO, etc.

The crystal seen is then placed in the container (or crucible) and the lid placed on it. The lid is held tightly in place by means of a weight. The container (or crucible) is then placed in a refractory metal susceptor to form the crucible assemblage. The susceptor is made of tantalum, platinum, irridium, rhodium or any other noble metals. The crucible assemblage containing the seed is then heated to the desired temperature (600–1850° C.) in a vacuum greater than $10^{-5}$ millimeters of mercury. The heating is accomplished either by sealing the crucible assembly in an evacuated silica tube and placing this tube in a resistance furnace or by placing the crucible assemblage in a vacuum system and heating it by radio frequency methods. In the former case, the temperature is limited to a temperature 1200° C. and in the latter, since the furnace walls are cold, temperatures above 1200° C. can be used.

The crucible assemblage containing the seed crystal is then heated for the time required to grow a crystal film of the desired thickness on the seed (for example, heating times can be 12 hours to 300 hours). The single crystal film growth takes place on the crystal seed acting as a substrate by a deposition of atoms or molecules from the inner walls of the container. At temperatures above about 600° C., there is enough thermal energy available to cause the atoms or molecules, which condense on the surface of the crystal seed, to orient in a manner similar to the orientation of the atoms on the surface of the seed crystal; thus, the deposition is an epitaxial process. In other words, if the seed crystal (or substrate) has a 100 orientation, then the growth of the crystals will also be in this direction. Ordinarily, the seed crystal is maintained at a temperature lower than the temperature of the container walls.

However, it is not necessary to have the seed crystal at a lower temperature than the container walls because growth takes place due to the fact that the surface energy of the seed crystal is lower than that of the container walls. Film thicknesses of the deposited single crystal film vary from 400 A. to a thickness of several microns.

The temperature ranges used in the process of the invention for growing single crystal films of europium oxide are 600–1600° C. and for the sulfide and selenide the temperature range is from 1350–1850° C. All the single crystal films of EuO, EuS, and EuSe exhibit high Verdet constants, of the order of magnitude of $Eu_2SiO_4$, even at room temperature because of their high magnetic susceptibility and high degree of transparency. As a result of this high Verdet constant, these europium chalcogenides in single crystal films can be used in magneto-optical devices such as laser beam modulators, light switches, and etc. In fact, the single crystal films of EuO, EuS, and EuSe because they are cubic and thus show more distinct positions for transmission and cancellation of polarized light have a distinct advantage over $Eu_2SiO_4$ in magneto-optical devices.

Table I gives the magnetic properties of single crystal films of EuO, EuS, and EuSe. The Curie temperature data is shown in the left-hand column and magnetic moment measure in Bohr magnetons appear in the right-hand column. All measurements were made using standard techniques.

TABLE I

| Material (Single Crystal Films) | Curie Temperature Degrees Kelvin | Magnetic Moment Bohr Magnetons |
|---|---|---|
| EuO | 70 | 6.90 |
| EuS | 18 | 6.85 |
| EuSe | 7 | 6.80 |

All the single crystal films of EuO, EuS, and EuSe prepared according to the process of the invention exhibit magneto-optical and optical properties.

The following specific examples represent embodiments of the process of the invention and, more particularly, disclose the preparation of single crystal films of europium II chalcogenides.

Example I.—Single crystal films of EuO

Europium oxide (EuO) is reduced to a fine powder by grinding in a dry box to prevent oxidation. The powder is placed in a die and pressed into a slug ½″ long by ⅜″ diameter with a pressure of 10,000 p.s.i. A ³⁄₁₆″ diameter hole is drilled in the slug to a depth of ⅜″ to form a crucible 2 which weighs about 3.5 grams. (Example I refers to FIG. 2.)

An EuO lid 5 is made for the EuO crucible by pressing EuO powder in a die at 10,000 p.s.i. to form a disc that is ⅜″ diameter by ⅛″ thick with a weight of about 1 gram. The mating surfaces of the EuO crucible and lid are ground flat to affect a tight seal.

A single crystal MgO substrate 1 ¹⁄₁₆″ by ⅛″ by ⁵⁄₁₆″ is prepared for use by polishing to a 1-micron finish and then treating with a suitable etchant such as a phosphoric acid solution (1 part $H_3PO_4$ to 4 parts of water). The MgO crystal 1 is immersed in the boiling solution and shaken vigorously for one minute, removed and rinsed thoroughly with water, and dried with acetone.

Figure 2:
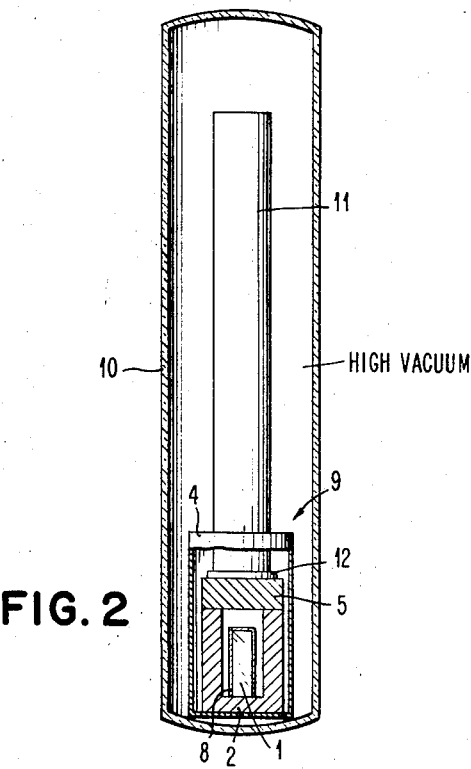
FIG. 2 is a schematic drawing of a sealed evacuated tube containing a crucible assembly which is used at temperatures between 600°–1200° C.
Figure 3:
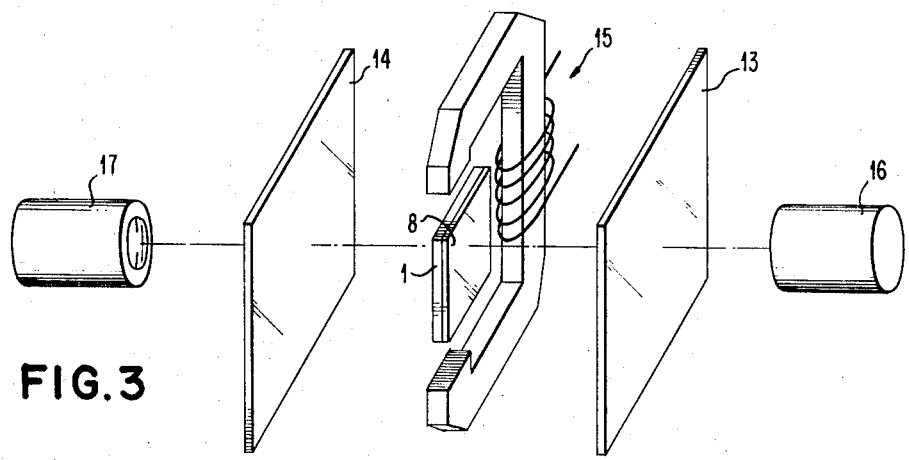
FIG. 3 is a diagrammatic drawing showing a magneto-optical device utilizing a transparent ferromagnetic single crystal film of a europium II chalcogenide.

The EuO crucible 2 is placed in a platinum susceptor 4 ¾″ long by ¹³⁄₃₂ I.D. by 0.005″ wall. The MgO substrate 1 is placed in the EuO crucible 2. The EuO lid 5 is placed on the EuO crucible 2. A platinum disc 12 ⅜″ diameter by 0.005″ thick is placed on the EuO lid 5. The entire crucible assemblage 9, FIG. 2, is placed in a silica tube 10 12 mm. I.D. by 1 mm. wall by 20″ long, and closed at one end. A weighting rod (stainless steel) 11 ⁵⁄₁₆″ diameter by 10″ long is placed in the silica tube 11 with one end in contact with the platinum disc 12 in order to weigh down the EuO lid 5 to produce a sintering action between the lid 5 and the crucible 2.

The outgassed silica tube 10 is evacuated to a pressure lower than $10^{-5}$ mm. of Hg and sealed to provide a capsule about 12″ long, FIG. 2.

Heating is accomplished by lowering the silica tube into a furnace at the rate of ½″ every 5 minutes until the crucible is in the hot zone of the furnace. An operating temperature of 1000° C. was maintained for a period of 282 hours. At the end of the heating period, the silica tube is removed at the rate of ½″ every 5 minutes. The MgO seed is then removed in a dry box. The seed crystal is now coated, on all surfaces, with a blue-red single crystal film of EuO 8.

Example II.—Single crystal films of EuO

Europium oxide (EuO) is comminuted to a fine powder in a dry box to prevent oxidation. The powder is placed in a ⅜″ interior diameter die and pressed into a slug ½″ long by ⅜″ in diameter with a pressure of 10,000 p.s.i. A ³⁄₁₆″ diameter hole is drilled in the slug to a depth of ⅜″ to form a crucible 2 weighing about 3.5 grams. (Example II refers to FIG. 1.) A lid for the crucible is made by pressing europium oxide powder in a die at a pressure of 10,000 p.s.i. to form a disc with ⅜″ diameter by ⅜″ thick and weighing about 1 gram. The mating surfaces of the europium oxide lid 5 and crucible 2 are ground flat to provide a tight seal.

The single crystal MgO substrate 1 is ¹⁄₁₆″ by ⅛″ by ⁵⁄₁₆″ is prepared for use by polishing to a 1-micron finish and then treating with a suitable etchant. The etchant used was a phosphoric acid solution (1 part $H_3P_4$ to four parts of water). The MgO substrate 1 is immersed in the boiling phosphoric acid solution for one minute with continuous vigorous agitation. It is then removed and rinsed thoroughly with water and dried with acetone.

The europium oxide crucible 2 is placed in a tantalum susceptor 4 that is ⁷⁄₁₆″ outer diameter by 1½″ long with 0.020″ walls. The MgO crystal substrate 1 is placed in the europium oxide crucible 2. The europium oxide lid 5 is placed on the europium oxide crucible 2. A plug of tantalum 3 that is ⅜″ O.C. by ¾″ long is placed on the EuO lid 5 to provide good contact between the lid 5 and crucible 2. This will increase the sintering action between the lid 5 and the europium oxide crucible 2 similar to the crucible assemblage shown in FIG. 2.

The crucible assemblage 9 is then placed in a silica glass furnace tube 6 which is connected to a vacuum system and is evacuated to a pressure less than $10^{-5}$ mm. of mercury. Heating is accomplished by means of a radio frequency coil 7 with tantalum acting as a susceptor 4. The temperature is raised to the operating temperature in a period from 30 to 60 minutes. The operating temperature is maintained in the range of from 1560° C. for a period of 30 hours. Cooling is accomplished over a period of two hours upon completion of the heat treatment. The resulting single crystal film 8 is similar to that described in Example I.

Example III.—Single crystal films of EuS

The procedure of Example I is repeated except that europium sulfide is used in place of the europium oxide of Example I. The CaO substrate is used in place of the MgO substrate of Example 1. The operating temperature is maintained at 1750° C. for a period of 60 hours. The resulting EuS single crystal film is yellow-red and is deposited on all surfaces of the CaO substrate.

Example IV.—Single crystal films of EuSe

The procedure of Example II is followed except that europium selenide is used in place of europium oxide of Example II. A SrO substrate is used in place of the MgO substrate of Example II. The operating temperature is maintained at 1680° C. for a period of 90 hours. The resulting EuSe single crystal film is a yellow-red.

The sizes of the crucible and substrates described above were for purposes of convenience only and are not considered to be any limitation as to the sizes that may be used in the process of the invention to produce single crystal films of desired dimensions. The single crystal substrates containing the single crystal film on all surfaces are treated in such a manner that only one surface is maintained for transmission of light in the magneto-optical device. This is accomplished either by grinding or polishing the other five coated surfaces of the seed crystal, thus removing the single crystal film of the europium II chalcogenide from these surfaces. This can also be accomplished by cleaving off the coated surface.

In the magneto-optical device shown diagrammatically in the drawing, a single crystal film of an europium II chalcogenide 8 on a substrate 1 is mounted between spaced cross polarizing filters (i.e., polarizer 13 and analyzer 14). The crystal is placed in a magnetic field (e.g., that produced by an electromagnet 15 or by Helmholtz coils). A light source 16 and a photosensitive cell 17 are so disposed that the light to which the photosensitive cell is exposed is that which originates at the light source and passes successively through polarizer 13, single crystal film 8, substrate 1, and analyzer 14. Since the degree of rotation of the plane of polarized light passing through the single crystal film of europium II chalcogenide is dependent upon the magnetic field, the amount of orientation of light originating in the light source and passing through the polarizer and analyzer and the single crystal film to the photosensitive cell can be varied by varying the strength of the magnetic field of the magnet. In the ferromagnetic region, at magnetic saturation, the rotation is independent of the applied magnetic field and the maximum rotation can be obtained.

When europium II chalcogenide single crystal films of sufficient thickness are grown, the use of the supporting substrate is unnecessary. The substrate can be removed by either cleaving or grinding it away.

The devices of the present invention have been described as made up essentially by single crystal films of either EuO, EuS, or EuSe which is placed in a magnetic field and associated optical instrumentation utilizing the Faraday effect. These devices may be manufactured according to the techniques known in the art for the manufacture of analogous devices embodying other single crystal devices. The best results are obtained when the specific rotation of the light passing through the crystal varies linearly with the applied magnetic field.

However, the maximum rotation obtainable for these materials can be obtained when operated in the ferromagnetic state, i.e., below their Curie temperature.

While the invention has been particularly shown and described with reference to a preferred embodiment thereof, it will be understood by those skilled in the art that various changes in form and details may be made therein without departing from the spirit and scope of the invention.

What is claimed is:

1. A process for preparing a transparent ferromagnetic single crystal film of a europium II chalcogenide selected from the group consisting of europium oxide, europium sulfide and europium selenide which comprises the steps of:
   (a) providing a substrate in the form of a seed crystal;
   (b) positioning said substrate in a sealed container which acts as source material for europium II chalcogenide;
   (c) heating said container in an evacuated chamber to a temperature sufficient to thereby deposit epitaxially a crystal film of europium II chalcogenide on said substrate.

2. A process for preparing a transparent ferromagnetic single crystal film of a europium II chalcogenide selected from the group consisting of europium oxide, europium sulfide and europium selenide which comprises the steps of:
   (a) providing a substrate in the form of a seed crystal;
   (b) positioning said substrate in a sealed europium II chalcogenide container which acts as source material for europium II chalcogenide, the walls of said container having a surface energy differing from the surface energy of said substrate;
   (c) heating said container in an evacuated chamber to a temperature between 600–1800° C. whereby the europium II chalcogenide from said container walls is transported and deposited epitaxially on said substrate.

3. The process of claim 2 wherein the surface energy of the substrate is lower than the surface energy of the walls of the europium II chalcogenide container.

4. The process of claim 2 wherein the europium II chalcogenide is EuO.

5. The process of claim 2 wherein the europium II chalcogenide is EuS.

6. The process of claim 2 wherein the europium II chalcogenide is EuSe.

References Cited

UNITED STATES PATENTS

| | | | |
|---|---|---|---|
| 3,034,924 | 5/1962 | Kraus et al. | 117—107 X |
| 3,234,494 | 2/1966 | Matthias | 252—62.5 X |
| 3,271,192 | 9/1966 | Thun et al. | 117—106 X |

ALFRED L. LEAVITT, *Primary Examiner.*

A. GOLIAN, *Assistant Examiner.*